(12) United States Patent
Jin

(10) Patent No.: US 8,971,523 B2
(45) Date of Patent: Mar. 3, 2015

(54) OVER-SAMPLED SINGLE-SIDED SUBBAND ECHO CANCELLATION

(75) Inventor: Gary Q. Jin, Kanata (CA)

(73) Assignee: Microsemi Semiconductor Corp., Kanata, Ontario (CA)

( * ) Notice: Subject to any disclaimer, the term of this patent is extended or adjusted under 35 U.S.C. 154(b) by 200 days.

(21) Appl. No.: 13/562,175

(22) Filed: Jul. 30, 2012

(65) Prior Publication Data

US 2013/0188797 A1    Jul. 25, 2013

(30) Foreign Application Priority Data

Sep. 7, 2011    (GB) .................................. 1115451.5

(51) Int. Cl.
*H04M 9/08*    (2006.01)
*H04R 3/00*    (2006.01)
*H04B 3/23*    (2006.01)

(52) U.S. Cl.
CPC . *H04R 3/002* (2013.01); *H04B 3/23* (2013.01)
USPC .................................................. 379/406.14

(58) Field of Classification Search
USPC .................................................... 379/406.14
See application file for complete search history.

(56) References Cited

U.S. PATENT DOCUMENTS

2006/0069556 A1* 3/2006 Nadjar et al. ................. 704/229
2010/0150365 A1   6/2010 Fujimaki

FOREIGN PATENT DOCUMENTS

GB    2344036 A    5/2000

OTHER PUBLICATIONS

Reilly, Wilbur, Seibert, Ahmadvand, "The Complex Subband Decomposition and its Application to the Decimation of Large Adaptive Filtering Problems", IEEE Transactions on SJONI\L Processing, vol. 50, No. II, Nov. 2002, pp. 2130-2743.
Weiss, Harteneck, Stewart,"On implementation and design of filter banks for subband adaptive systems", IEEE Workshop on Signal Processing Systems (SIPS), Oct. 1998, pp. 172-181.
Huang, Kyriakakis, "Real-valued Delayless Subband Affine Projection Algorithm for Acoustic Echo Cancellation", IEEE Asilomar Conference on Signals, Systems and Computers, vol. 1, No. 7-10, Nov. 2004, pp. 259-262.
Chin, Farhang-Boroujeny, "Subband adaptive filtering with real-valued subband signals for acoustic echo cancellation", IEEE Proceedings on Vision, Image and Signal Processing, vol. 148, No. 4, Aug. 2001, pp. 283-288.
Search Report for German patent application GB1115451.5 dated Jan. 6, 2012, 2 pages.

* cited by examiner

*Primary Examiner* — Alexander Jamal
(74) *Attorney, Agent, or Firm* — Lee & Hayes, PLLC

(57) ABSTRACT

A method of echo cancellation, particularly for use in high definition applications, splits an input signal and reference signal into M single-sided sub-band. The subbanded signals are downsampled at a downsampling rate N, where N≤M, adaptively filtered, and recombined to produce an output signal. The sub-bands are preferably oversampled such that N<M. The use of oversampling and single-sided sub-banding reduces complexity and avoids aliasing problems.

12 Claims, 8 Drawing Sheets

OVER-SAMPLED SINGLE-SIDED SUBBAND ECHO CANCELLATION

PRIORITY APPLICATION

This application claims priority to Great Britain Application Serial No. 1115451.5, entitled "Over-Sampled Single-Sided Subband Echo Cancellation," filed on Sep. 7, 2011, which is fully incorporated by reference herein.

FIELD OF INVENTION

This invention relates to the field of signal processing, and more particularly to echo cancellation.

BACKGROUND OF THE INVENTION

Echo cancellation is typically used in telephony to describe the process of removing echo from a voice communication in order to improve voice quality on a telephone call. Adaptive filters are used to model the echo remove the echo from the signal. In telepresence video conferencing systems, the audio signal has high sampling rate and the filter length increases proportionally to the sampling rate. How to manage the computation complexity for high definition audio cancellation is a challenge task.

Echo cancellation has been used extensively in telecommunications, cellular phone and video conferencing. The search for mathematical algorithms to perform echo cancellation has produced many different approaches with varying degrees of complexity, cost, and performance.

In some applications, for example the cancellation of acoustic speech echoes, the echo duration can be extremely long, in the order of 100 msec to 500 msec. A traditional approach to echo cancellation uses an adaptive transversal filter of length L, where L equals the number of samples necessary to extend just beyond the duration of the echo. The computational requirement is proportional to 2 L for the popular LMS class of algorithm, and proportional to L2 or higher for algorithms such as RLS. The more robust algorithms (RLS being one example) have improved convergence characteristics, but the computational load increases dramatically with L. It is also fair to say that the convergence time increases exponentially with the size of L for most algorithms. It is important to have fast convergence, and this is especially true in the example of acoustic speech echo cancellation because the echo path may be continually changing as people and objects move within the environment. An echo canceller that can deal with an echo length of 500 msec or more has problems with computational complexity as well as convergence speed.

In the recent application of Tele Presence systems, the high definition quality of an audio signal with a 48 KHz sampling rate further increases computational complexity (or MIPS requirement) for echo cancellation. A 256 ms. echo tails means a filter length of 12288 samples and adaptation has to be done 48000 times per second. A simple LMS approach will need a 1200MIPS operation. To reduce the computational burden, one commonly known approach, known as sub-band processing, involves separating the speech signal into frequency bands and processing each band separately. This has some inherent advantages, most notably reduced computational complexity, and increased convergence speed. Such as system is described in Q. Jin, K. M. Wong and Z. Q. Luo, "Optimum Filter Banks for Signal Decomposition and Its Application in Adaptive Echo Cancellation", IEEE Trans. on SP. Vol. 44, No. 7, 1996, pp. 1669-1680, and U.S. Pat. No. 5,937,009, the contents of which are herein incorporated by reference.

Sub-band processing is an attractive approach because it reduces computational complexity. By dividing the signal into M sub-bands, there are M adaptive filters to implement instead of only 1, but these sub-band signals can be downsampled by a factor of M, consequently the filter outputs need only be calculated 1/M as often. Additionally the length of the filters themselves is reduced from length L to length L/M. This has the overall effect of reducing the computational complexity (not including filter banks) to something on the order of 2 L/M for LMS type adaptive filters, which also improves convergence behavior due to the use of shorter LMS filters. It can be seen that when L is large, there is a significant reduction in computational load, making the overhead necessary for filter banks insignificant.

A typical prior echo cancellation technique using a sub-band filter bank is shown in FIG. 1. Both echo and reference signal are decomposed into sub-bands and the adaptive algorithm is implemented in each individual band. Finally, the echo-reduced signal is reconstructed with a bank of synthesis filters.

The problem with the sub-band filter bank approach is that the transition between bands makes it impossible to perfectly isolate each band from the adjacent ones without the use of "ideal" band pass filters. "Ideal" in this context means filters with infinitely sharp cut-off. There is a trade-off between the amounts of echo cancellation possible, the filter roll-off, filter group delay distortion, and reconstruct ability of the sub-bands to regenerate the original input signal without distortion. A type of filter known as a QMF is one method of filter bank design that has been used in the past to help overcome these problems.

The main concern with echo cancellation using sub-band decomposition is that the down sampling process creates distortion in each band due to aliasing. This effect causes the echo channel to be time-varying, a violation of an underlying assumption that we need to make in order to apply known methods of adaptive filters for voice echo cancellation. The echo channel must be both linear and time-invariant. Any processing done on the signal decomposition invalidates this property and results in signal distortion. This limits the amount of overall achievable echo cancellation using the method of sub-band decomposition and reconstruction.

One previous approach to fix the aliasing problem is cross-band echo cancellation described in U.S. Pat. No. 5,937,009. It uses adjacent band to cancel the aliasing echo component when the sub-band filter is not a brick-wall filter. The problem with such approach is that the computation complexity for LMS filter increases by three times.

SUMMARY OF THE INVENTION

The challenge with HD audio applications is the high audio sampling rate, which means high computational cost and low convergence speed. The present invention finds a compromise between the product cost and echo cancellation perfbrmance.

According to the present invention there is provided a method of echo cancellation comprising splitting an input signal and reference signal into M single-sided sub-bands; downsampling the input signal in the sub-bands at a down-sampling rate N, where N≤M; adaptively filtering the single-sided sub-bands; and recombining the filtered sub-bands to produce an output signal. In one embodiment, N<M, so that the signal in the subbands is oversampled.

This invention uses subband technology to reduce the computation complexity and also solves the aliasing problem present in the subband approach.

According to a second aspect of the invention there is provided an echo cancellation circuit comprising an analysis band part wherein an input signal and reference signal are split into M single-sided sub-bands; downsamplers for downsampling the input signal in the sub-bands by a downsampling rate N, where N<M; adaptive filters for adaptively filtering the single-sided sub-bands; and a synthesis band part or recombining the filtered sub-bands to produce an output signal.

The invention is preferably implemented using a polyphase DFT-based filter bank architecture on a real signal to reduce implementation complexity.

BRIEF DESCRIPTION OF THE DRAWINGS

This invention will now be described in more detail, by way of example only, with reference to the accompanying drawings, in which:—

DETAILED DESCRIPTION OF EXEMPLARY EMBODIMENTS

Figure 1:
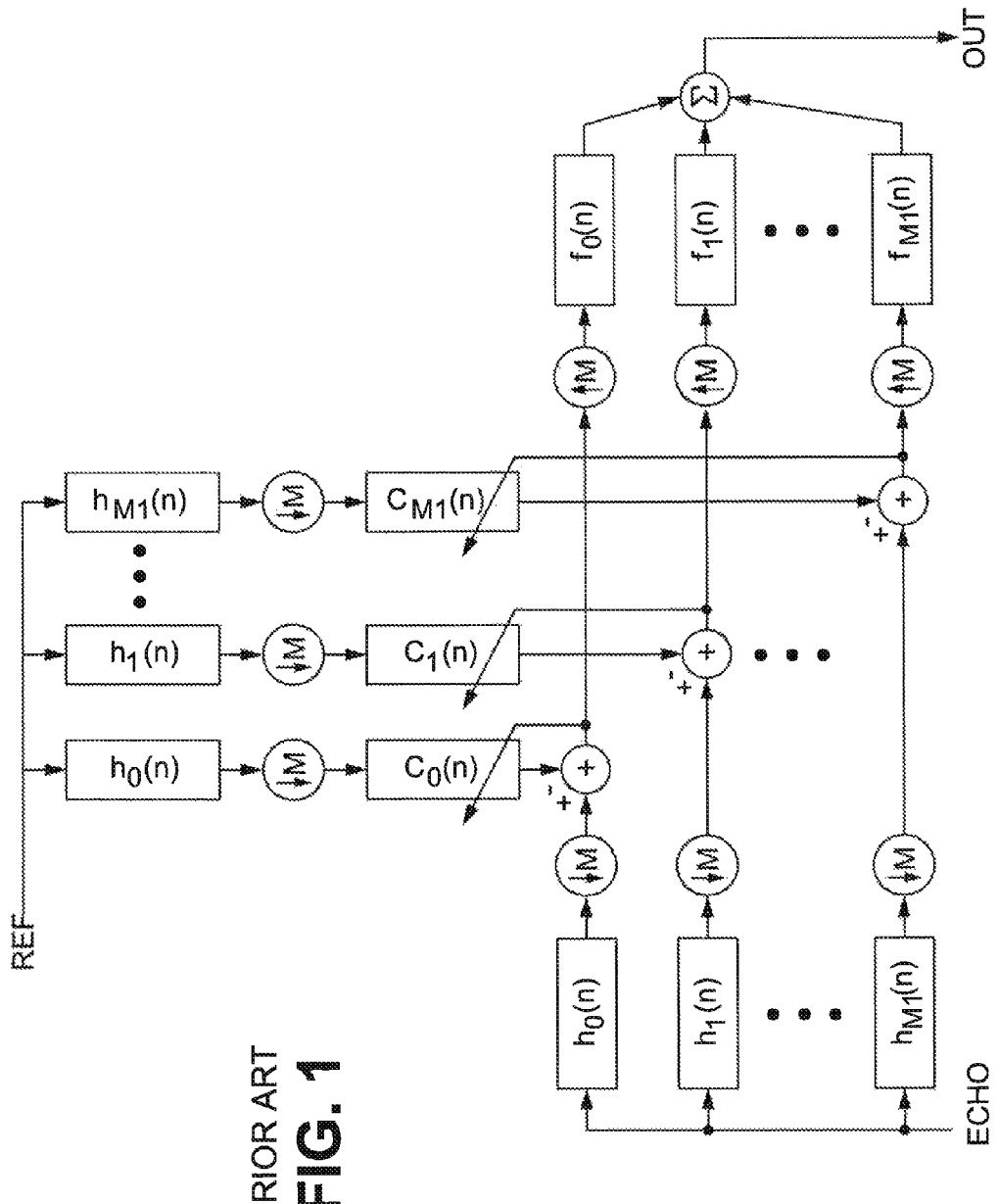
FIG. 1 shows a prior art sub-band echo cancellation architecture.

One way to solve the aliasing problem is not to use the critical sampling rate. If the signal is decomposed into M bands, the signal downsampling rate N is set as a value smaller than M. In a downsampling operation, only every Nth sample is let through, where N is referred to as the downsampling rate. This will give us an oversampled filter bank. The oversampled filter bank for echo cancellation is shown in Fig.2. The architecture in Fig.2 is very similar to the one in Fig. 1. In FIG. 2 the input signal is split into M bands by the analysis filter bank down, and each sub-band is downsampled by downsamplers 12. The filtered subbands are then upsampled by upsamplers 14 passed through a synthesis filter bank 16 and recombined in summer 25. The reference signal is likewise split into M subbands by filter bank 18 and downsampled by Downsamplers 20.

Adaptive filters 22 modify the reference signal, which is subtracted from the echo signal in subtractors 24 (Adders with a minus input).

Figure 2:
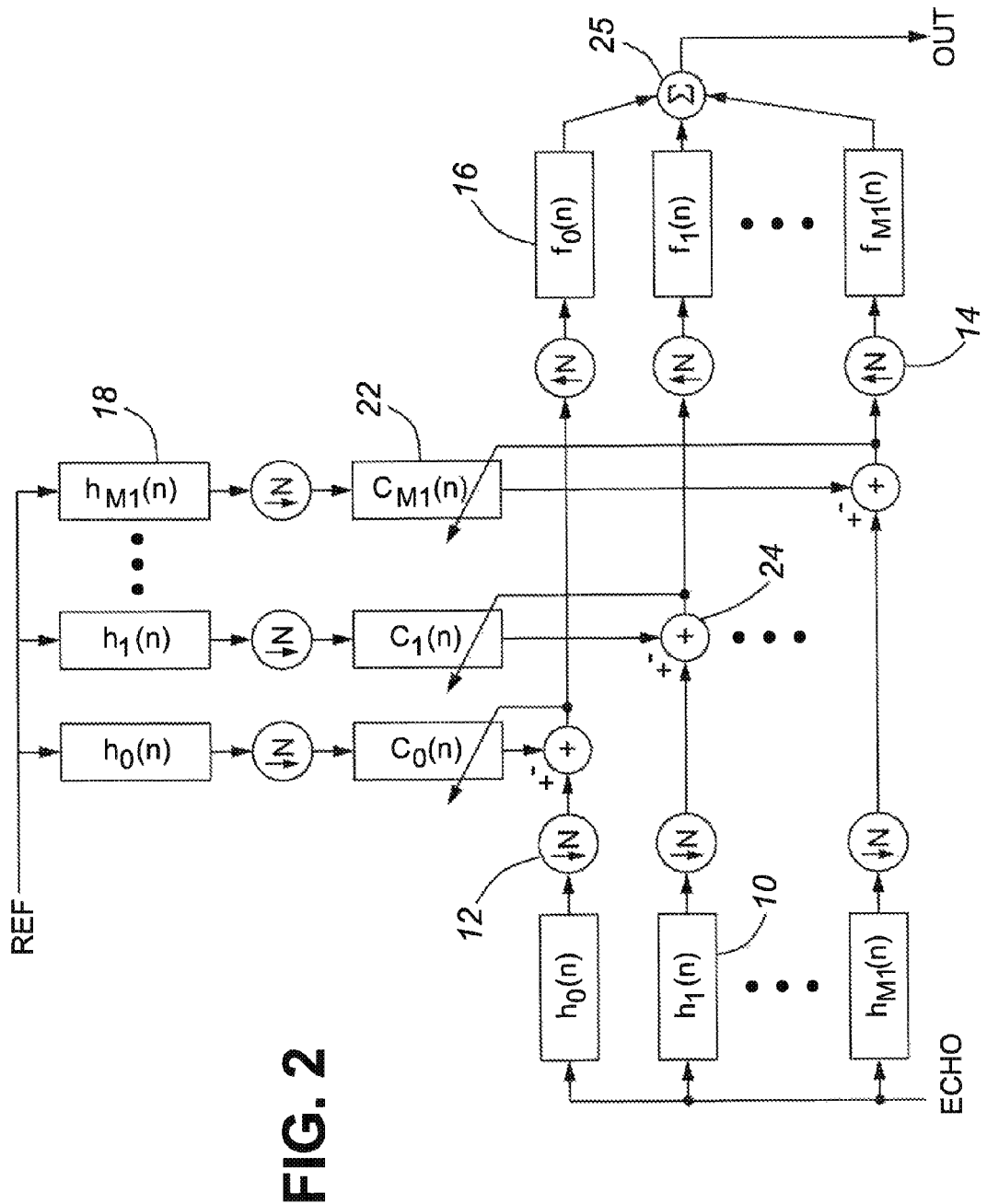
FIG. 2 shows an oversampled sub-band architecture for echo cancellation.

The only difference between FIG. 1 and FIG. 2 is the down sampling rate, after M analysis filter bank for echo and reference signals, is N<M, instead of M.

Figure 3:
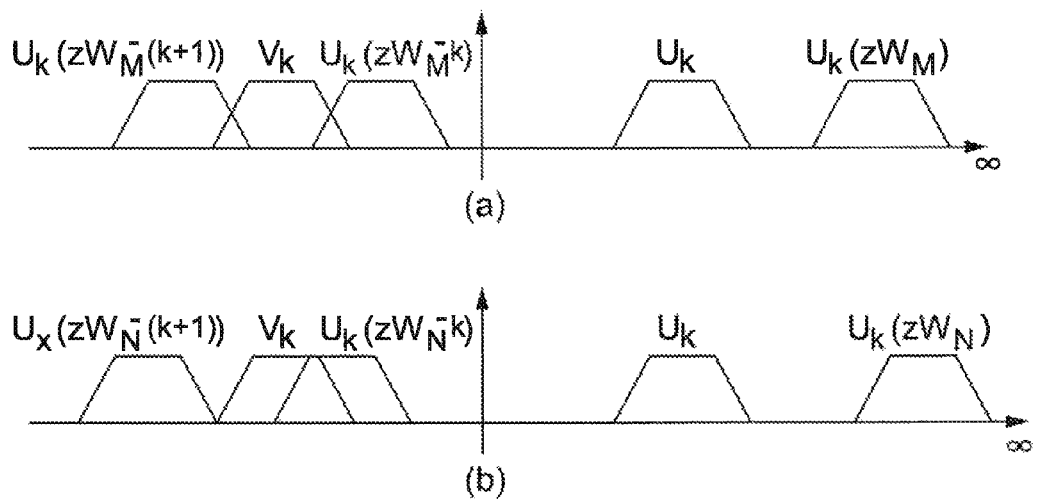
FIG. 3 illustrates the aliasing of a down-sampled signal.

In general, the smaller the down sampling rate N is, the less the alias is. This is true for the low-pass filter. For a band-pass filter $H_k(z)$, if the filter coefficient is real, it will have two symmetrical bands, $U_k$ and $V_k$ as shown in FIG. 3. Let input signal be X(z). Passing through $H_k(z)$, we have Y(z)=X(z) $H_k(z)$. After down sampling N, we have the final analysis band output $$\frac{1}{N}\sum_{n=0}^{N-1} H_k(z^{1/N}W^n)X(z^{1/N}W^n)$$

with $W=e^{-j2\pi/N}$. The aliasing component is $X(zW^n) H_k(zW^n)$ for n≠0.

In FIG. 3 (a), which shows a critical downsampling rate (N=M), the shift version of $U_k$ in $X(zW^n) H_k(zW^n)$ (n≠0) will not create aliasing in itself but to $V_k$. For the oversampled signal (N<M), the $U_k(zW)$ is further away from $U_k$, and $U_k(zW^{-(k-1)})$ is further away from $V_k$ (as shown in FIG. 3(b)). The aliasing will be reduced for these two components. But the aliasing between $U_k(zW^{-k})$ and $V_k$ increases. The overall aliasing is thus not reduced but increased.

Figure 4:
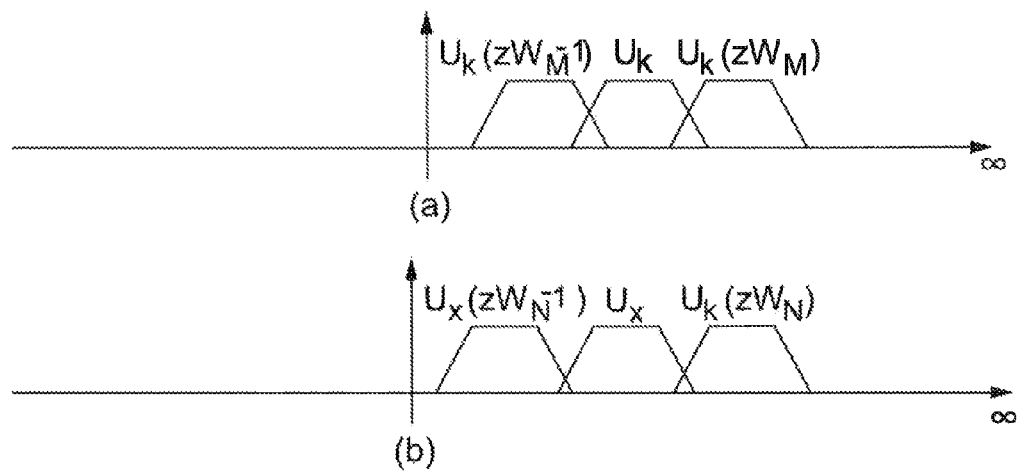
FIG. 4 illustrates the aliasing of down-sampling for a single-sided signal.

FIG. 4 shows the single sided band decomposition in frequency domain. The single sided band has only one band with complex filter coefficients. Because there is only one band, the number of analysis sub-bands will double that of in FIG. 3 if $U_k$ has the same bandwidth for FIG. 3 and FIG. 4.

FIG. 4(a) shows the single side band with critical down sampling rate (N=M). The aliasing components for $U_k$ mainly come from $U_k(zW)$ and $U_k(zW^{-1})$. With the oversampled filter bank (N<M), both $U_k(zW)$ and $U_k(zW^{-1})$ move away from $U_k$, and aliasing will be reduced with decreasing of down sampling rate N. Therefore, the architecture of FIG. 2 with oversampled filter bank (N<M) will reduce aliasing in each sub-band and provide better echo cancellation performance.

For single-sided sub-band decomposition, the decomposed signals are all complex numbers, which means that the multiplication operation will be increased by four times and addition will be increased by twice. Overall MIPS consumption will be possible four times higher for LMS filtering. However, for a real input signal, the sub-band signal has symmetrical property (symmetrical for real part and anti-symmetrical for the imaginary part). This means that it is possible to process only half of sub-band signals, and this will reduce operations by 2 times with a MIPS reduction of ½. The synthesis filter bank is also reduced by half and the final echo reduced signal output will take only the real part of its synthesis output, as shown in FIG. 5, where unit 28 takes the real part of summer 25.

Figure 5:
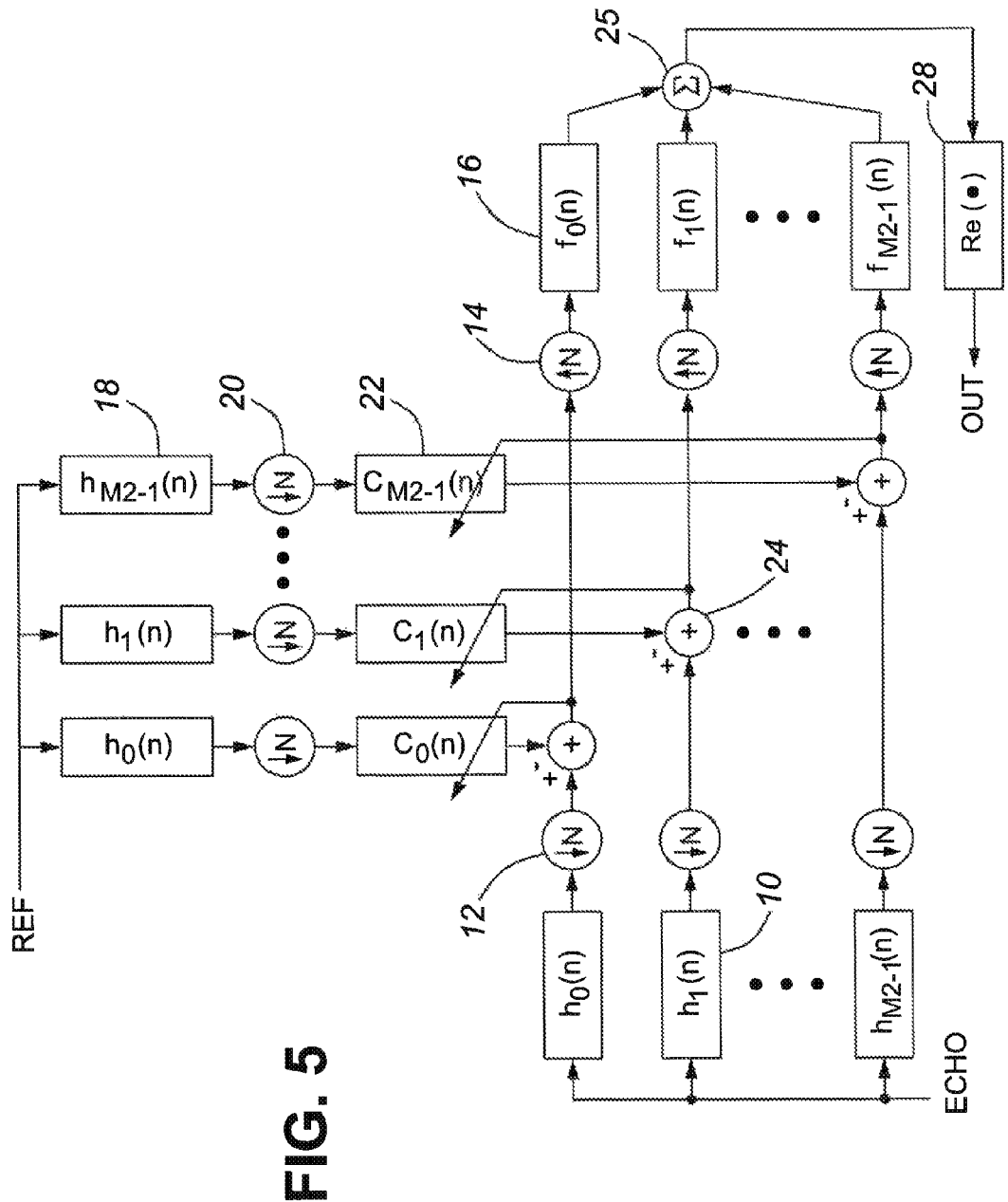
FIG. 5 shows an exemplary single sided over-sampled sub-band architecture.

In FIG. 5, we process M/2 bands with a down sampling rate of N (N≤M). The computation reduction (with respect to the whole band LMS algorithm) is $2M/N^2$. If we chose M=16 and N=14, the MIPS requirement will be reduced to 0.1633 of the original value.

All analysis band and synthesis band filters can be derived from a single prototype filter through frequency shifting. This creates a so-called DFT (Discreet Fourier Transform) Based Filter Bank as described in and P. P. Vaidyanathan, "Multirate Systems and Filter Banks" Prentice-Hall, Inc. 1993 Yuan-Pei Lin and P. P. Vaidyanathan, "A Kaiser Window Approach for the Design of Prototype Filters of Cosine Modulation Filterbanks". IEEE Signal Processing Letters, vol. 5, No. 6, June 1998, pp. 132-134, the contents of which are herein incorporated by reference.

Figure 6:
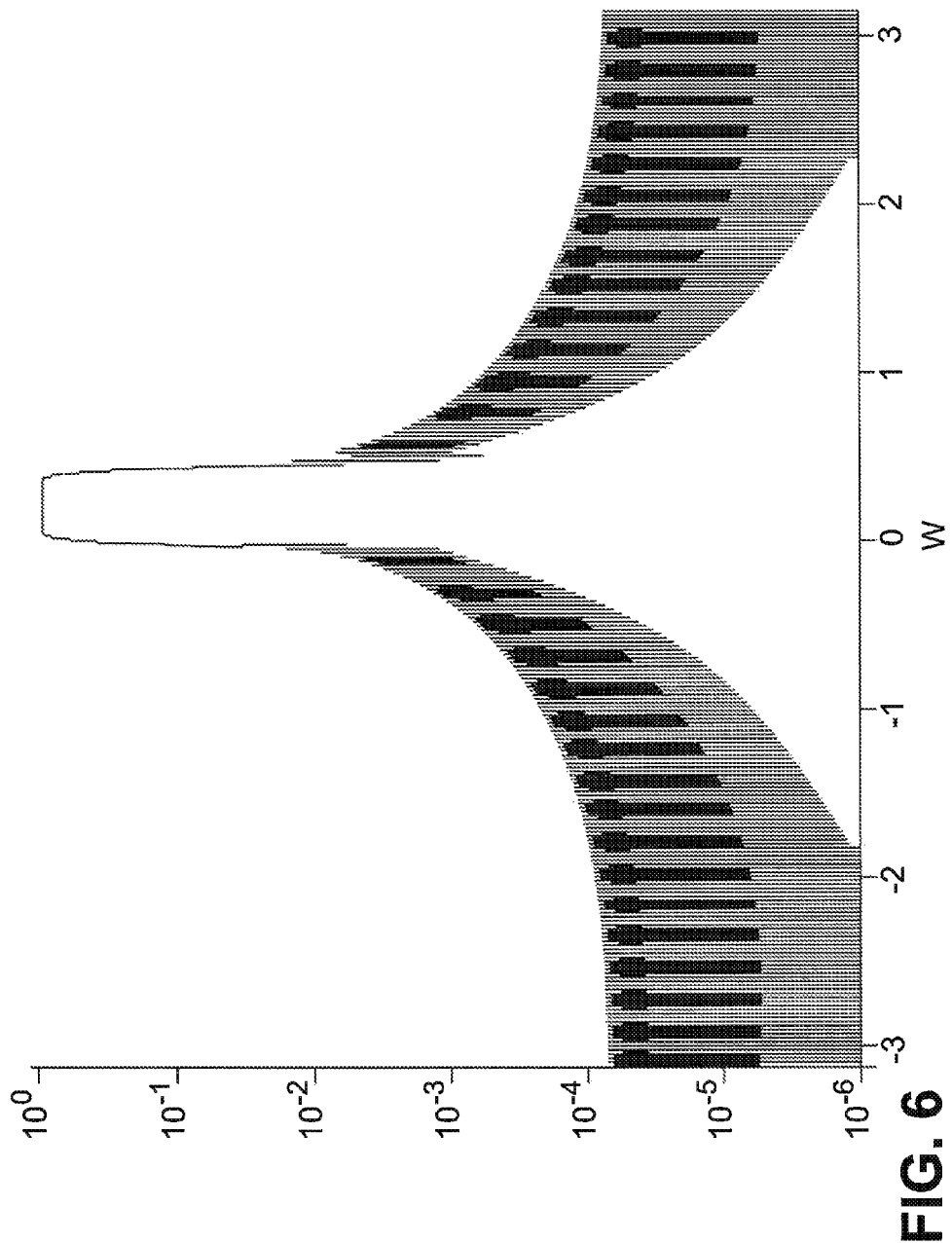
FIG. 6 shows the frequency response of a prototype filter for a DFT-based single-sided sub-band filter bank (M=16)

An example of a prototype filter frequency response with linear phase is shown in FIG. 6 with M=16. Let symmetrical linear phase prototype filter be P(z). The analysis and synthesis filter banks can be obtained as $H_k(z)=F_k(z)=P(zW_M^k)$ with $W_M=e^{j2\pi/M}$.

Figure 7:
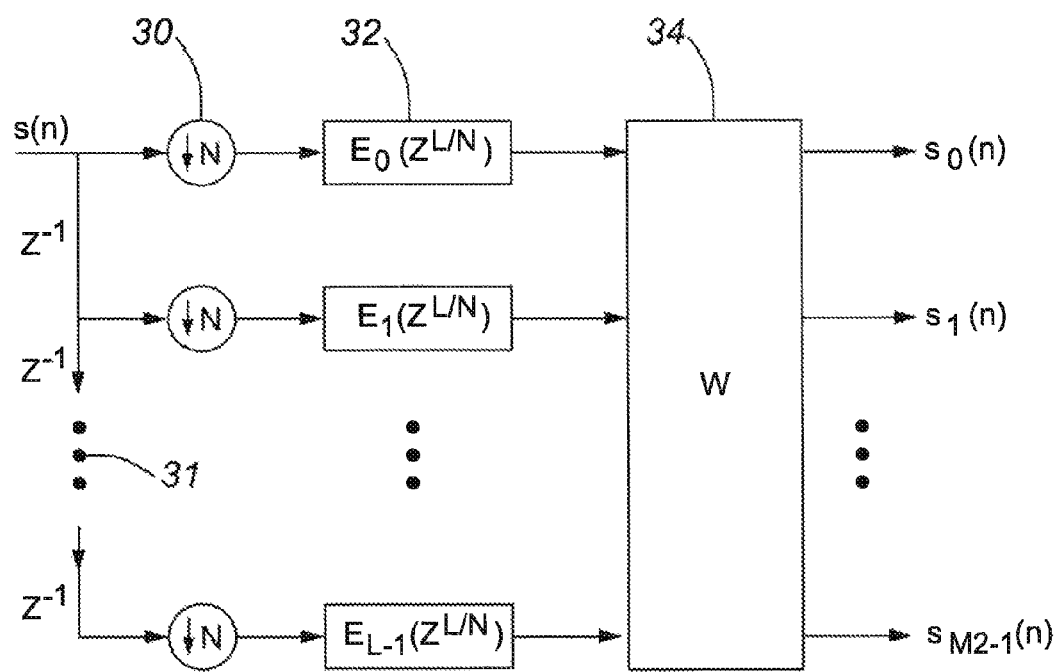
FIG. 7 shows a polyphase structure for the analysis band in the proposed Architecture.
Figure 8:
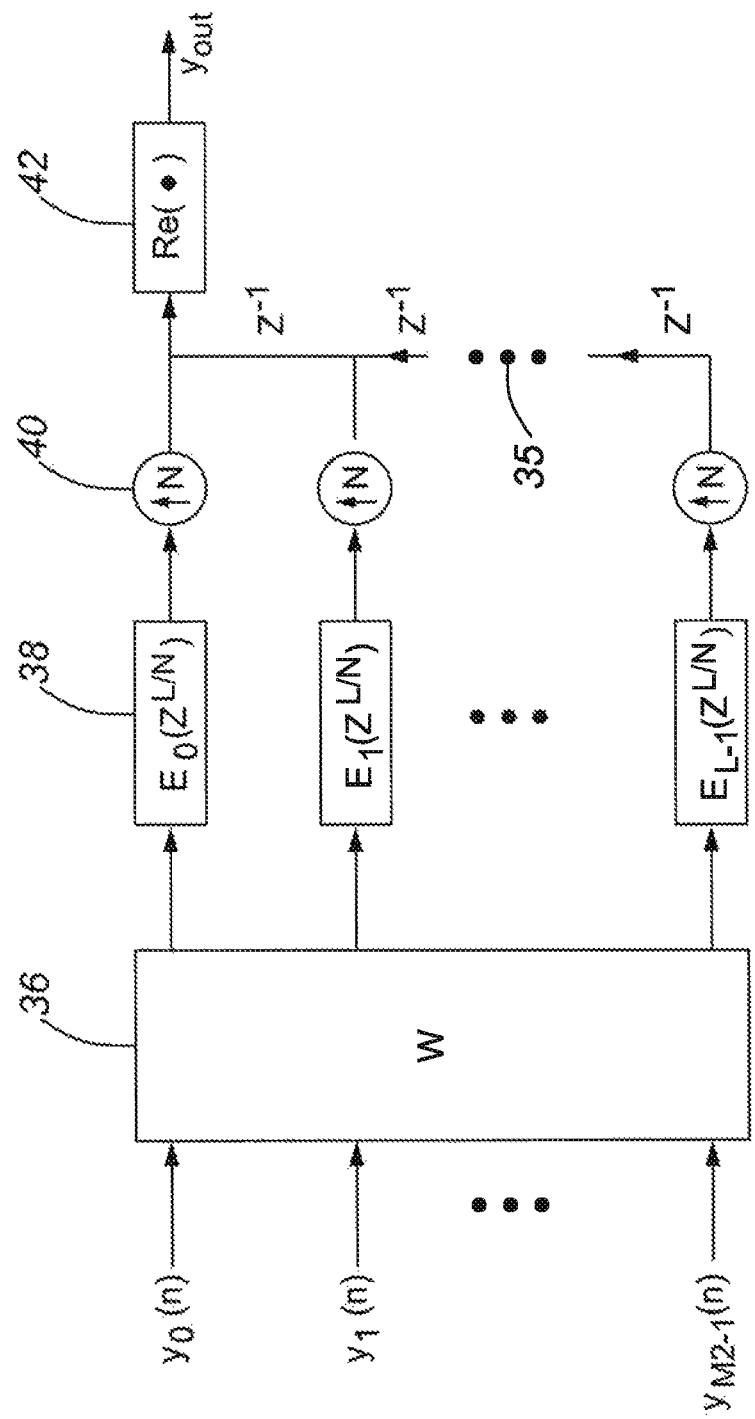
FIG. 8 shows a polyphase Structure for the synthesis hand in the proposed architecture.

An exemplary polyphase implementation for analysis and synthesis banks is shown in FIGS. 7 and 8 respectively, where $E_l(z)$ is the lth polyphase of P(z) with $$E_l(z) = \sum_{g=0}^{\infty} p(\ell + gL) z^{-gL/N}$$

and W is an L by M/2 matrix with its lmth element being $W_M^{lm}$. $W^T$ is the transpose of matrix W. L is the least integer common multiple of M and N such that L/M and L/N are both integers In FIG. 7, the input signal s(n) is input to downsamplers 30 through a delay line 31. The subbanded signals are passed through polyphase filter 32 to matrix multiplication block 34, which outputs the processed subbanded signals $s_0(n)$, $s_1(n)$ ... In FIG. 8, the processed subbanded signals $y_0(n)$, $y_1(n)$ are input to matrix block 36, passed through polyphase filter 38, upsamplers 40, and through delay lines 35 to unit 42 for extracting the real part of the signal.

The polyphase structure will reduce M/2 filters to one filter with an extra L by M/2 matrix multiplications at reduced sampling rate. These are the extra operations beside adaptive operations and all these operations are dealing with complexity numbers. Therefore, one multiplication is equivalent to four real number multiplication.

If a low pass prototype filter p(n) is used with real coefficients, we can modify the matrix element (W) to be $W_M^{lm+1/2}$. The end result will be the poly phase filters $E_1(Z^L)$ (l=0, 1, ..., L−1) are all real coefficients and the analysis band matrix operation becomes L by M/2 real and complex matrix multiplications, and the MAC operation is reduced by half comparing with two complex number multiplication. The synthesis band matrix operation can also be reduced by half by taking the real output of the matrix multiplications (see FIG. 9). The final polyphase filter is done with real numbers.

Figure 9:
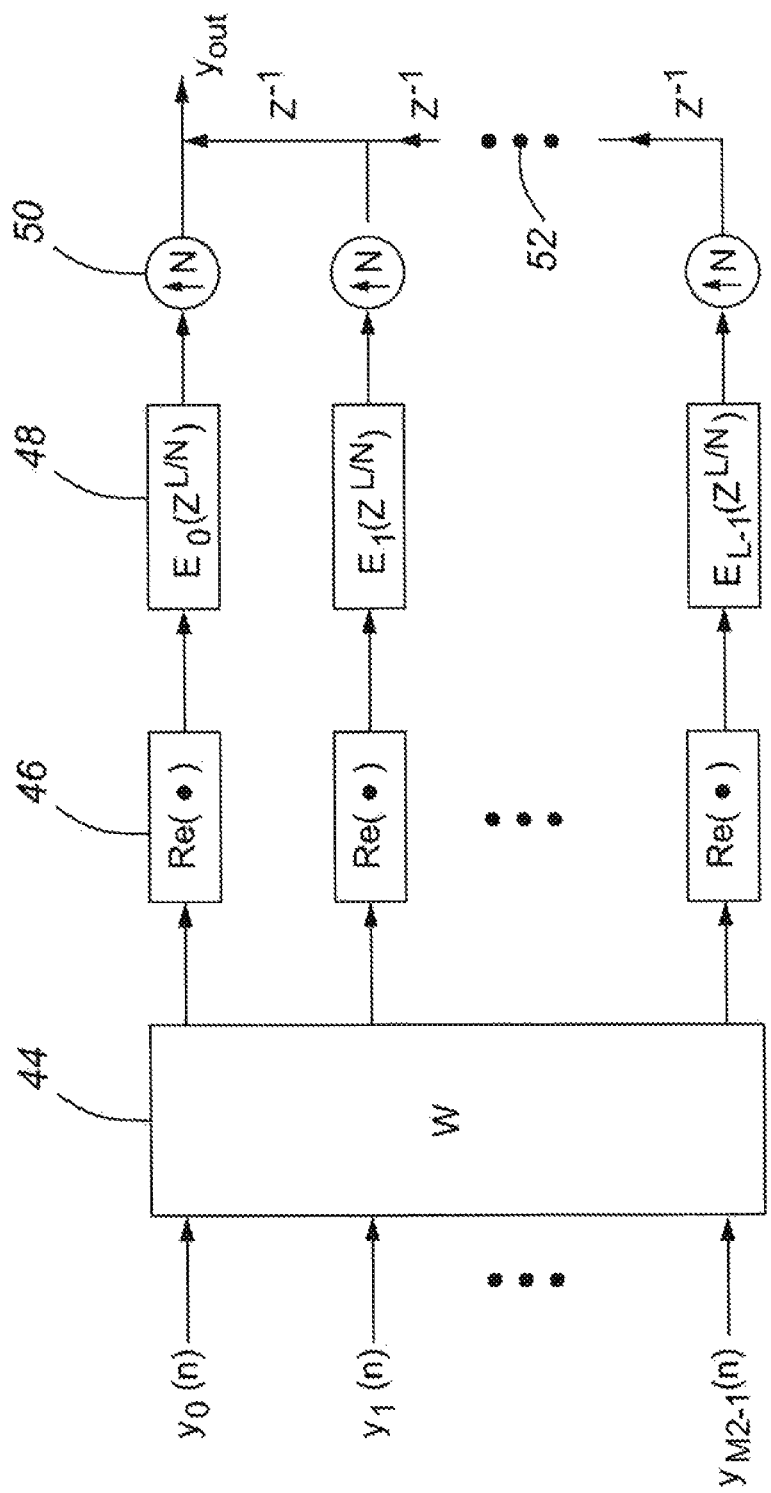
FIG. 9 shows the polyphase structure for the synthesis band in the proposed architecture with real filter coefficients.

In FIG. 9, the processed subbanded signals $y_0(n)$, $y_1(n)$ are input to matrix block 44. Units 46 take the real parts of the output of matrix block 44 and apply them to polyphase filters 48. The outputs of the polyphase filters are passed through upsamplers 50 and combined with delay line 52 to provide output $y_{out}$.

Features of the described embodiments include the use of oversampling for sub-band for echo cancellation, single sided DFT based filter bank for echo cancellation, and oversampled single sided DFT based filter bank for echo cancellation.

It should be appreciated by those skilled in the art that any block diagrams herein represent conceptual views of illustrative circuitry embodying the principles of the invention. The invention may be implemented on a processor, which may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The term circuit is used herein to encompass functional blocks that may in practice be implemented in software.

The invention claimed is:

1. A method of echo cancelation comprising:
   decomposing an echo signal and a reference signal into decomposed signals within M single-sided sub-bands using filters with complex coefficients;
   downsampling the decomposed echo signals and reference signals within the single-sided sub-bands at a downsampling rate N, where N<M;
   adaptively filtering the decomposed reference signals within the single-sided sub-bands;
   subtracting the adaptively filtered decomposed reference signals from the decomposed echo signals within the single-sided sub-bands to produce processed signals within the sub-bands;
   upsampling the processed signals within the sub-bands;
   recombining the upsampled processed signals to produce a recombined signal; and
   extracting a real part of the recombined signal to produce an output signal.

2. A method as claimed in claim 1, wherein a DFT-based filter bank architecture is employed.

3. A method as claimed in claim 2, wherein the DFT-based filter bank architecture uses a polyphase structure.

4. A method as claimed in claim 3, wherein the echo signal is passed through a low pass prototype filter with real coefficients, and the DFT-based architecture includes a matrix multiplication unit W, where W is an L by M/2 matrix with its lmth element of the form $W_M^{lm}$.

5. A method as claimed in claim 4, wherein prior to passing the sub-banded signal through a synthesis polyphase filter bank, the real part of the sub-banded signal is extracted to provide the input signal to the synthesis polyphase filter bank.

6. A method as claimed in claim 5, wherein sub-banded signal is passed through a matrix multiplication unit $W^T$, where $W^T$ is the transpose matrix of W prior to having its real part extracted.

7. An echo cancelation circuit comprising:
   an analysis band part wherein an echo signal and reference signal are decomposed into decomposed signals within M single-sided sub-bands using filters with complex coefficients;
   downsamplers for downsampling the echo signals and reference signals within the sub-bands at a downsampling rate N, where N<M;
   adaptive filters for adaptively filtering the decomposed reference signals within the single-sided sub-bands;
   subtractors for subtracting the adaptively filtered decomposed reference signals from the decomposed echo signals within the sub-bands to produce processed signals within the sub-bands;
   upsamplers for upsampling the processed signals within the sub-bands;
   a synthesis band part for recombining the processed signals within the sub-bands; and
   a real part extraction block downstream of a filter bank in the synthesis band part to extract a real part of the recombined processed signals to produce an output signal.

8. An echo cancellation circuit as claimed in claim 7, further comprising a DFT-based filter bank architecture.

9. An echo cancellation circuit as claimed in claim 8, wherein the DFT-based filter bank architecture comprises a polyphase structure.

10. An echo cancellation circuit as claimed in claim 9, wherein the DFT-based architecture comprises art analysis band part with a low pass prototype filter with real coefficients, and the DFT-based architecture in the analysis band includes a matrix multiplication unit W, where W is an L by M/2 matrix with its lmth element of the form $W_M^{lm}$.

11. An echo cancellation unit as claimed in claim 10, wherein the real part extraction block is downstream of a synthesis polyphase filter bank in the synthesis band part.

12. An echo cancellation unit as claimed in claim 11, further comprising a matrix multiplication unit $W^T$, where $W^T$ is the transpose matrix of W, configured to receive the sub-banded singnal.

* * * * *